US010118568B2

(12) United States Patent
Salter et al.

(10) Patent No.: US 10,118,568 B2
(45) Date of Patent: Nov. 6, 2018

(54) VEHICLE BADGE HAVING DISCRETELY ILLUMINATED PORTIONS

(71) Applicant: Ford Global Technologies, LLC, Dearborn, MI (US)

(72) Inventors: Stuart C. Salter, White Lake, MI (US); James J. Surman, Clinton Township, MI (US); Pietro Buttolo, Dearborn Heights, MI (US); Paul Kenneth Dellock, Northville, MI (US); Michael A. Musleh, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 143 days.

(21) Appl. No.: 15/065,240

(22) Filed: Mar. 9, 2016

(65) Prior Publication Data

US 2017/0259755 A1    Sep. 14, 2017

(51) Int. Cl.
| | |
|---|---|
| *B60Q 9/00* | (2006.01) |
| *B60R 13/00* | (2006.01) |
| *F21K 9/64* | (2016.01) |
| *G09F 13/04* | (2006.01) |
| *G09F 13/20* | (2006.01) |
| *G09F 21/04* | (2006.01) |
| *F21S 43/13* | (2018.01) |

(52) U.S. Cl.
CPC .............. *B60R 13/005* (2013.01); *F21K 9/64* (2016.08); *F21S 43/13* (2018.01); *G09F 13/0404* (2013.01); *G09F 13/20* (2013.01); *G09F 21/04* (2013.01)

(58) Field of Classification Search
CPC .... B60Q 1/2607; B60Q 1/26; B60Q 2400/20; B60Q 1/56; G09F 13/04; G09F 2013/044; G09F 2013/222; G09F 13/42; G09F 13/06; G09F 13/08; G09F 9/30; G09F 9/302
See application file for complete search history.

(56) References Cited

U.S. PATENT DOCUMENTS

| | | | |
|---|---|---|---|
| 2,486,859 | A | 11/1949 | Meijer et al. |
| 5,053,930 | A | 10/1991 | Benavides |
| 5,390,436 | A * | 2/1995 | Ashall .................. G02B 6/0043 362/618 |
| 5,434,013 | A | 7/1995 | Fernandez |
| 5,709,453 | A | 1/1998 | Krent et al. |
| 5,839,718 | A | 11/1998 | Hase et al. |
| 6,031,511 | A | 2/2000 | DeLuca et al. |
| 6,117,362 | A | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — Ismael Negron
(74) *Attorney, Agent, or Firm* — Jason Rogers; Price Heneveld LLP

(57) ABSTRACT

A badge includes a housing having a front viewable portion, a first light source disposed rearwardly of the viewable portion, a second light source disposed adjacently to the first light source, a third light source disposed adjacently to the second light source, and a controller that illuminates the first, the second, and the third light sources sequentially at offset intervals.

16 Claims, 12 Drawing Sheets

(56) References Cited

U.S. PATENT DOCUMENTS

| | | | |
|---|---|---|---|
| 6,190,026 B1* | 2/2001 | Moore | B60Q 1/50 362/459 |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,012,544 B2* | 3/2006 | Cunningham | G09F 13/04 340/815.55 |
| 7,015,893 B2 | 3/2006 | Li et al. | |
| 7,161,472 B2 | 1/2007 | Strumolo et al. | |
| 7,175,324 B2* | 2/2007 | Kwon | B60Q 1/50 362/540 |
| 7,213,923 B2 | 5/2007 | Liu et al. | |
| 7,216,997 B2 | 5/2007 | Anderson, Jr. | |
| 7,249,869 B2* | 7/2007 | Takahashi | B60R 13/005 362/300 |
| 7,264,366 B2 | 9/2007 | Hulse | |
| 7,264,367 B2 | 9/2007 | Hulse | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2* | 10/2011 | Messere | B32B 17/10 257/88 |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,408,773 B2* | 4/2013 | Judge | B60Q 1/2696 362/605 |
| 8,414,154 B2* | 4/2013 | Dau | F21S 8/04 362/249.02 |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,662,570 B2 | 3/2014 | Guenther et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 | 6/2014 | Marx et al. | |
| 8,773,012 B2 | 7/2014 | Ryu et al. | |
| 8,816,586 B2* | 8/2014 | Marcove | B60Q 1/2607 315/77 |
| 8,827,496 B2 | 9/2014 | VanderSchuit | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,022,631 B2* | 5/2015 | Mulder | G02B 6/006 362/601 |
| 9,041,309 B1 | 5/2015 | Shane | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,376,055 B2* | 6/2016 | Sura | B60Q 1/56 |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0265360 A1* | 11/2011 | Podd | G09F 9/33 40/541 |
| 2012/0001406 A1 | 1/2012 | Paxton et al. | |
| 2012/0104954 A1 | 5/2012 | Huang | |
| 2012/0182722 A1* | 7/2012 | Wu | B60R 13/005 362/157 |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0204344 A1 | 7/2014 | Harris | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0340886 A1* | 11/2014 | Deutsch | G02B 6/006 362/231 |
| 2014/0373898 A1 | 12/2014 | Rogers et al. | |
| 2015/0046027 A1 | 2/2015 | Sura et al. | |
| 2015/0109602 A1 | 4/2015 | Martin et al. | |
| 2015/0138789 A1 | 5/2015 | Singer et al. | |
| 2015/0197186 A1 | 7/2015 | Salter et al. | |
| 2015/0267881 A1 | 9/2015 | Salter et al. | |
| 2015/0307033 A1 | 10/2015 | Preisler et al. | |
| 2016/0016506 A1 | 1/2016 | Collins et al. | |

(56) References Cited

U.S. PATENT DOCUMENTS

| | | |
|---|---|---|
| 2016/0102819 A1 | 4/2016 | Misawa et al. |
| 2016/0131327 A1 | 5/2016 | Moon et al. |
| 2016/0236613 A1 | 8/2016 | Trier |
| 2017/0043709 A1* | 2/2017 | Dellock ............... G02B 6/0068 |
| 2017/0158125 A1 | 6/2017 | Schuett et al. |

FOREIGN PATENT DOCUMENTS

| | | |
|---|---|---|
| CN | 201193011 Y | 2/2009 |
| CN | 201893584 U | 7/2011 |
| CN | 201914179 U | 8/2011 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2203032 A2 | 6/2010 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

VEHICLE BADGE HAVING DISCRETELY ILLUMINATED PORTIONS

FIELD OF THE INVENTION

The present disclosure generally relates to vehicle lighting systems, and more particularly, to a vehicle lighting system for a badge.

BACKGROUND OF THE INVENTION

Illumination arising from the use of photoluminescent structures offers a unique and attractive viewing experience. It is therefore desired to implement such structures in automotive vehicles for various lighting applications.

SUMMARY OF THE INVENTION

According to one aspect of the present invention, a badge for a vehicle is disclosed. The badge includes a housing having a viewable portion. A first light source is disposed rearwardly of the viewable portion. A second light source is disposed adjacently to the first light source. A third light source is disposed adjacently to the first light source. The first, the second, and the third light sources are configured to illuminate at offset intervals.

According to another aspect of the present invention, a badge is disclosed. The badge includes a housing having a front viewable portion. The front viewable portion includes a plurality of independently illuminable portions. A plurality of light sources is disposed within each independently illuminable portion. The plurality of light sources is distributed into sets within each illuminable portion and is configured to illuminate in a predefined pattern based on a vehicular condition.

According to another aspect of the present invention, a badge for a vehicle is disclosed. The badge includes a housing having a front viewable portion. A substrate is attached to the housing and has a rear viewable portion. A first set of light sources is configured to independently direct light through the front viewable portion and the rear viewable portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes an illuminated badge that may be attached to a vehicle. The badge may include one or more photoluminescent structures configured to convert an excitation light received from an associated light source to a converted light at a different wavelength typically found in the visible spectrum.

Figure 1A:
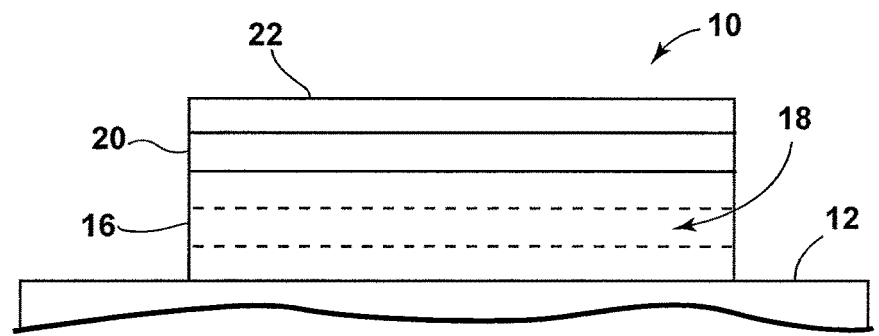
FIG. 1A is a side view of a photoluminescent structure rendered as a coating for use in a vehicle badge according to one embodiment.
Figure 1B:
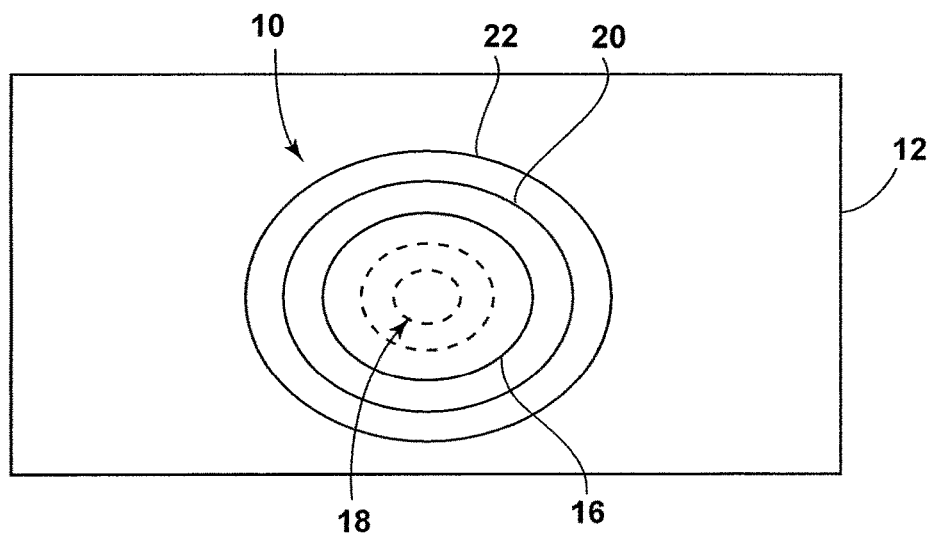
FIG. 1B is a top view of a photoluminescent structure rendered as a discrete particle according to one embodiment.
Figure 1C:
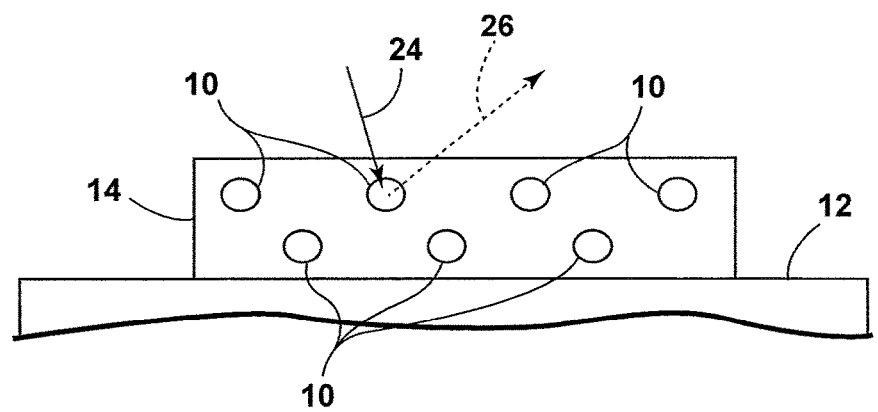
FIG. 1C is a side view of a plurality photoluminescent structures rendered as discrete particles and incorporated into a separate structure.

Referring to FIGS. 1A-1C, various exemplary embodiments of photoluminescent structures 10 are shown, each capable of being coupled to a substrate 12, which may correspond to a vehicle fixture or vehicle related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with a substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent or fluorescent properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26 that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by a light source 40 (FIG. 3) is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The energy conversion layer 16 may be applied to a substrate 12 by painting, screen-printing, spraying, slot coating, dip coating, roller coating, and bar coating. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into a substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some embodiments, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principle driving mechanism for an energy conversion process corresponding to a change in wavelength of light. In the various embodiments discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

Additional information regarding the construction of photoluminescent structures 10 is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference. For additional information regarding fabrication and utilization of photoluminescent materials to achieve various light emissions, refer to U.S. Pat. No. 8,207,511 to Bortz et al., entitled "PHOTOLUMINESCENT FIBERS, COMPOSITIONS AND FABRICS MADE THEREFROM"; U.S. Pat. No. 8,247,761 to Agrawal et al., entitled "PHOTOLUMINESCENT MARKINGS WITH FUNCTIONAL OVERLAYERS"; U.S. Pat. No. 8,519,359 B2 to Kingsley et al., entitled "PHOTOLYTICALLY AND ENVIRONMENTALLY STABLE MULTI-LAYER STRUCTURE FOR HIGH EFFICIENCY ELECTROMAGNETIC ENERGY CONVERSION AND SUSTAINED SECONDARY EMISSION"; U.S. Pat. No. 8,664,624 B2 to Kingsley et al., entitled "ILLUMINATION DELIVERY SYSTEM FOR GENERATING SUSTAINED SECONDARY EMISSION"; U.S. Patent Publication No. 2012/0183677 to Agrawal et al., entitled "PHOTOLUMINESCENT COMPOSITIONS, METHODS OF MANUFACTURE AND NOVEL USES"; U.S. Pat. No. 9,057,021 to Kingsley et al., entitled "PHOTOLUMINESCENT OBJECTS"; and U.S. Patent Publication No. 2014/0103258 A1 to Agrawal et al., entitled "CHROMIC LUMINESCENT COMPOSITIONS AND TEXTILES," all of which are incorporated herein by reference in their entirety.

According to one embodiment, the photoluminescent material 18 may include organic or inorganic fluorescent dyes including rylenes, xanthenes, porphyrins, phthalocyanines. Additionally, or alternatively, the photoluminescent material 18 may include phosphors from the group of Ce-doped garnets such as YAG:Ce and may be a short persistence photoluminescent material 18. For example, an emission by $Ce^{3+}$ is based on an electronic energy transition from $5d^1$ to $4f^1$ as a parity allowed transition. As a result of this, a difference in energy between the light absorption and the light emission by $Ce^{3+}$ is small, and the luminescent level of $Ce^{3+}$ has an ultra-short lifespan, or decay time, of $10^{-8}$ to $10^{-7}$ seconds (10 to 100 nanoseconds). The decay time may be defined as the time between the end of excitation from the excitation light 24 and the moment when the light intensity of the converted light 26 emitted from the photoluminescent structure 10 drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

According to one embodiment, a $Ce^{3+}$ garnet may be utilized, which has a peak excitation spectrum that may reside in a shorter wavelength range than that of conventional YAG:Ce-type phosphors. Accordingly, $Ce^{3+}$ has short persistence characteristics such that its decay time may be 100 milliseconds or less. Therefore, in some embodiments, the rare earth aluminum garnet type Ce phosphor may serve as the photoluminescent material 18 with ultra-short persistence characteristics, which can emit the converted light 26 by absorbing purple to blue excitation light 24 emitted from a light source 40. According to one embodiment, a ZnS:Ag phosphor may be used to create a blue converted light 26. A ZnS:Cu phosphor may be utilized to create a yellowish-green converted light 26. A $Y_2O_2S$:Eu phosphor may be used to create red converted light 26. Moreover, the aforementioned phosphorescent materials may be combined to form a wide range of colors, including white light. It will be understood that any short persistence photoluminescent material known in the art may be utilized without departing from the teachings provided herein. Additional information regarding the production of short persistence photoluminescent materials is disclosed in U.S. Pat. No. 8,163,201 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," the entire disclosure of which is incorporated herein by reference.

Additionally, or alternatively, the photoluminescent material 18, according to one embodiment, disposed within the photoluminescent structure 10 may include a long persistence photoluminescent material 18 that emits the converted light 26, once charged by the excitation light 24. The excitation light 24 may be emitted from any excitation source (e.g., any natural light source, such as the sun, and/or any artificial light source 40). The long persistence photoluminescent material 18 may be defined as having a long decay time due to its ability to store the excitation light 24 and release the converted light 26 gradually, for a period of several minutes or hours, once the excitation light 24 is no longer present.

The long persistence photoluminescent material 18, according to one embodiment, may be operable to emit light at or above an intensity of 0.32 mcd/m$^2$ after a period of 10 minutes. Additionally, the long persistence photoluminescent material 18 may be operable to emit light above or at an intensity of 0.32 mcd/m$^2$ after a period of 30 minutes and, in some embodiments, for a period substantially longer than 60 minutes (e.g., the period may extend 24 hours or longer, and in some instances, the period may extend 48 hours). Accordingly, the long persistence photoluminescent material 18 may continually illuminate in response to excitation from any light sources 40 that emits the excitation light 24, including, but not limited to, natural light sources (e.g., the sun) and/or any artificial light source 40. The periodic absorption of the excitation light 24 from any excitation source may provide for a substantially sustained charge of the long persistence photoluminescent material 18 to provide for consistent passive illumination. In some embodiments, a light sensor may monitor the illumination intensity of the photoluminescent structure 10 and actuate an excitation source when the illumination intensity falls below 0.32 mcd/m$^2$, or any other predefined intensity level.

The long persistence photoluminescent material 18 may correspond to alkaline earth aluminates and silicates, for example doped di-silicates, or any other compound that is capable of emitting light for a period of time once the excitation light 24 is no longer present. The long persistence photoluminescent material 18 may be doped with one or more ions, which may correspond to rare earth elements, for example, $Eu^{2+}$, $Tb^{3+}$ and/or $Dy^3$. According to one non-limiting exemplary embodiment, the photoluminescent structure 10 includes a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The photoluminescent structure 10, according to one embodiment, may be a translucent white color, and in some instances reflective, when unilluminated. Once the photoluminescent structure 10 receives the excitation light 24 of a particular wavelength, the photoluminescent structure 10 may emit any color light (e.g., blue or red) therefrom at any desired brightness. According to one embodiment, a blue emitting phosphorescent material may have the structure $Li_2ZnGeO_4$ and may be prepared by a high temperature solid-state reaction method or through any other practicable method and/or process. The afterglow may last for a duration of two to eight hours and may originate from the excitation light 24 and d-d transitions of $Mn^{2+}$ ions.

According to an alternate non-limiting exemplary embodiment, 100 parts of a commercial solvent-borne polyurethane, such as Mace resin 107-268, having 50% solids polyurethane in Toluene/Isopropanol, 125 parts of a blue green long persistence phosphor, such as Performance Indicator PI-BG20, and 12.5 parts of a dye solution containing 0.1% Lumogen Yellow F083 in dioxolane may be blended to yield a low rare earth mineral photoluminescent structure 10. It will be understood that the compositions provided herein are non-limiting examples. Thus, any phosphor known in the art may be utilized within the photoluminescent structure 10 without departing from the teachings provided herein. Moreover, it is contemplated that any long persistence phosphor known in the art may also be utilized without departing from the teachings provided herein.

Additional information regarding the production of long persistence photoluminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," the entire disclosure of which is incorporated herein by reference. For additional information regarding long persistence phosphorescent structures, refer to U.S. Pat. No. 6,953,536 to Yen et al., entitled "LONG PERSISTENT PHOSPHORS AND PERSISTENT ENERGY TRANSFER TECHNIQUE"; U.S. Pat.

No. 6,117,362 to Yen et al., entitled "LONG-PERSISTENT BLUE PHOSPHORS"; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," all of which are incorporated herein by reference in their entirety.

Figure 2:
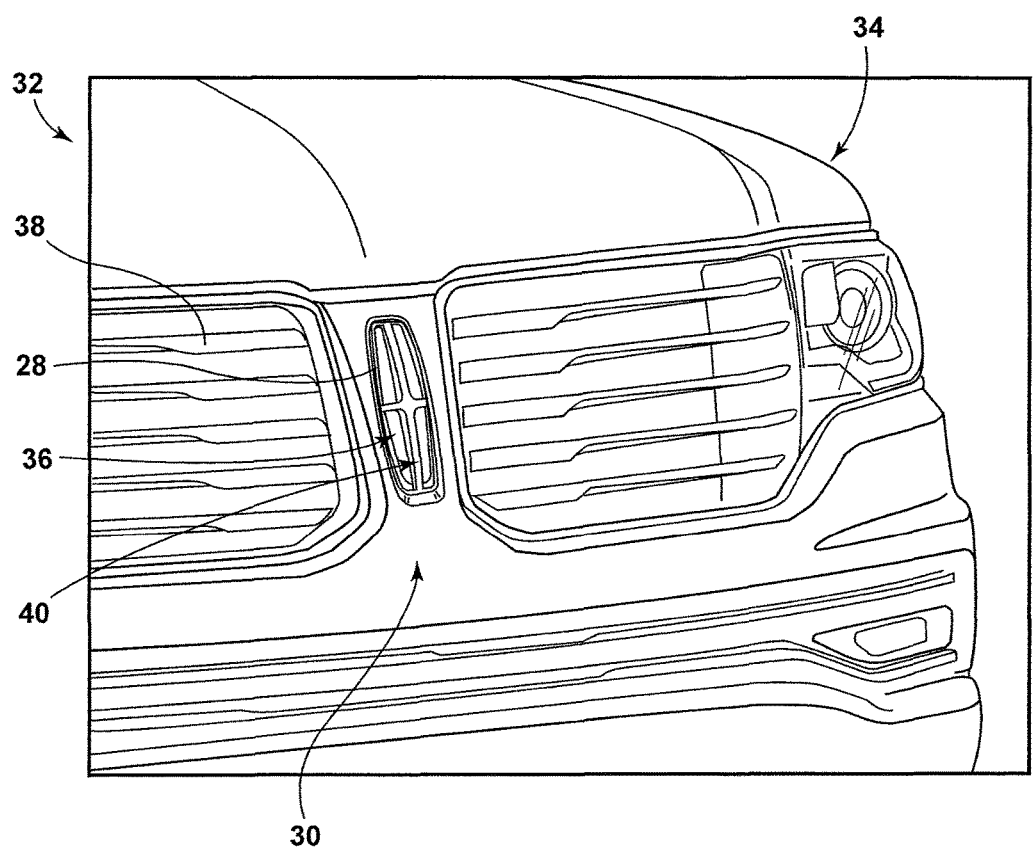
FIG. 2 is a front perspective view of a vehicle equipped with an illuminated badge on a grille assembly of a vehicle, according to one embodiment.

Referring now to FIG. 2, a badge 28 is generally shown mounted on a front portion 30 of a vehicle 32. In other embodiments, the badge 28 may be located elsewhere, such as, but not limited to, other locations of the front portion 30, a side portion 34, or a rear portion of the vehicle 32. Alternatively, the badge 28 may be disposed inside the vehicle 32. The badge 28 may be configured as an insignia that is presented as an identifying mark of a vehicle manufacturer and includes a front viewable portion 36 that is generally prominently displayed on the vehicle 32. In the presently illustrated embodiment, the badge 28 is centrally located on a grille assembly 38 of the vehicle 32, thus allowing the badge 28 to be readily viewed by an observer looking head-on at the vehicle 32. As will be described below in greater detail, one or more light sources 40 may be disposed within the badge 28 and may illuminate in a plurality of manners to provide a distinct styling element to the vehicle 32.

Figure 3:
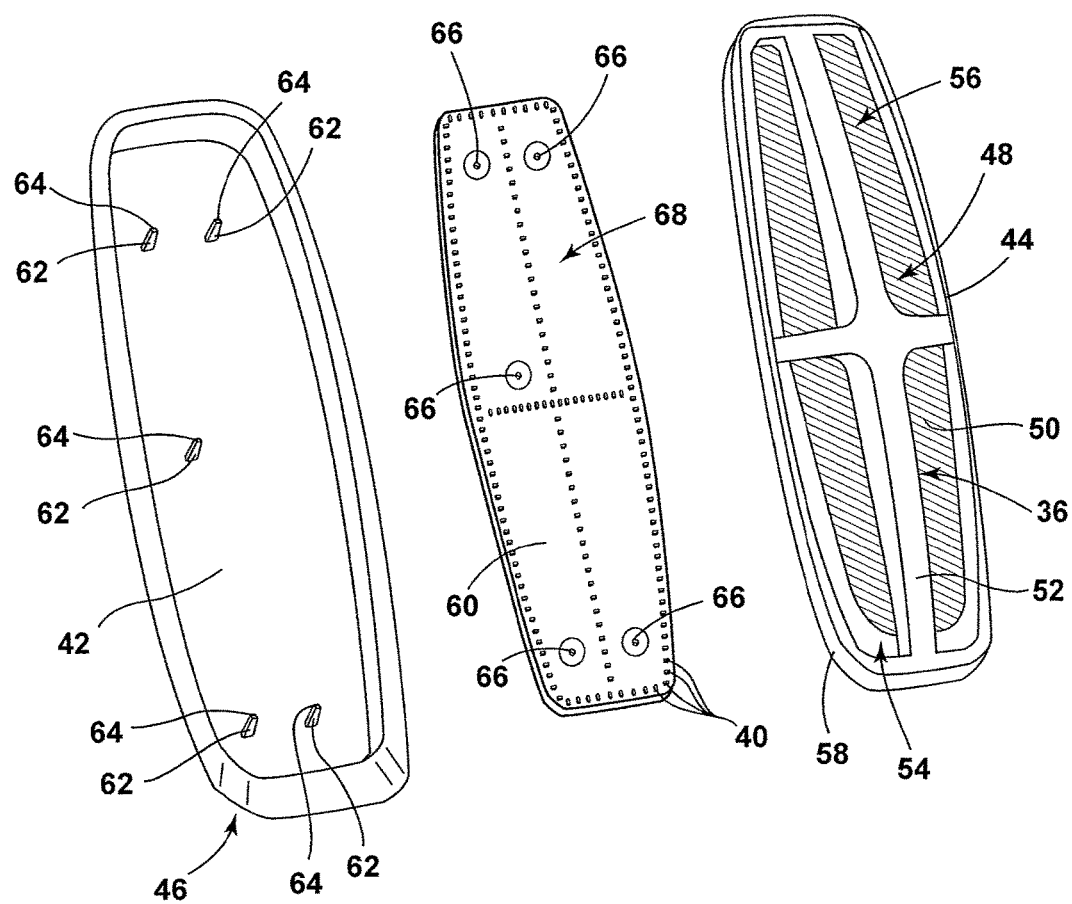
FIG. 3 is an exploded view of the badge, according to one embodiment.

Referring to FIG. 3, the badge 28 is shown, according to one embodiment, having a substrate 42 that may be attached to a housing 44. The substrate 42 may form a rear portion 46 of the badge 28 and may be capable of being secured to the vehicle 32. However, in alternate embodiments, the housing 44 may substantially encase the badge 28 such that the substrate 42 and the housing 44 are a single component.

The housing 44 may include the front viewable portion 36 centrally located on a forward portion 48 thereof. The front viewable portion 36 may include a background region 50 and indicia 52. The indicia 52 may signify the make, model, or any other information that may be desirable to confer about the vehicle 32 upon which the badge 28 is attached to. The front viewable portion 36 may include a transparent and/or translucent portion 54 and one or more substantially opaque portion(s) 56, which may be configured as opaque coatings applied to the front viewable portion 36. In alternative embodiments, some, or all, of the front viewable portion 36 may be left open to the front portion 30 of the vehicle 32.

As illustrated in FIG. 3, the housing 44 includes a peripheral portion 58 that extends rearwardly therefrom. It will be understood, however, that the peripheral portion 58, or any other portion described herein, may be integrally formed with any other components, or later attached thereto without departing from the teachings provided herein. For example, the peripheral portion 58 may be an independent component or integrally formed with the substrate 42 in alternate embodiments.

According to one embodiment, the substrate 42 and/or the housing 44 may be constructed from a rigid material such as, but not limited to, a polymeric material and may be assembled to one another via sonic welding, laser welding, vibration welding, injection molding, or any other process known in the art. Alternatively, the substrate 42 and the housing 44 may be assembled together via the utilization of adhesives and/or fasteners. Alternatively still, the substrate 42 and the housing 44 may be integrally formed as a single component.

With further reference to FIG. 3, a printed circuit board (PCB) 60 may be secured between the substrate 42 and housing 44. According to one embodiment, the substrate 42 includes a plurality of raised platforms 62. A fastener hole 64 is defined by each platform 56. A plurality of corresponding through holes 66 is defined by the PCB 60. Accordingly, a plurality of fasteners may be disposed within the through holes 66 and into the fastener holes 64 for removably fixing the PCB 60 to the substrate 42.

The PCB 60 may have one or more light sources 40 disposed thereon. The light source 40 may include any form of light source. For example, fluorescent lighting, light emitting diodes (LEDs), organic LEDs (OLEDs), polymer LEDs (PLEDs), solid-state lighting, or any other form of lighting configured to emit light may be utilized. According to one embodiment, the light sources 40 may be configured to emit a wavelength of excitation light 24 that is characterized as ultraviolet light (~10-400 nanometers in wavelength), violet light (~380-450 nanometers in wavelength), blue light (~450-495 nanometers in wavelength), and/or infrared light (IR) (~700 nm-1 mm in wavelength) to take advantage of the relative low cost attributable to those types of LEDs. A reflective (e.g., white) solder mask 68 may be applied to the PCB 60 to reflect light incident thereon. In alternate embodiments, the light sources 40 may be disposed on any other component without departing from the teachings provided herein.

Figure 4:
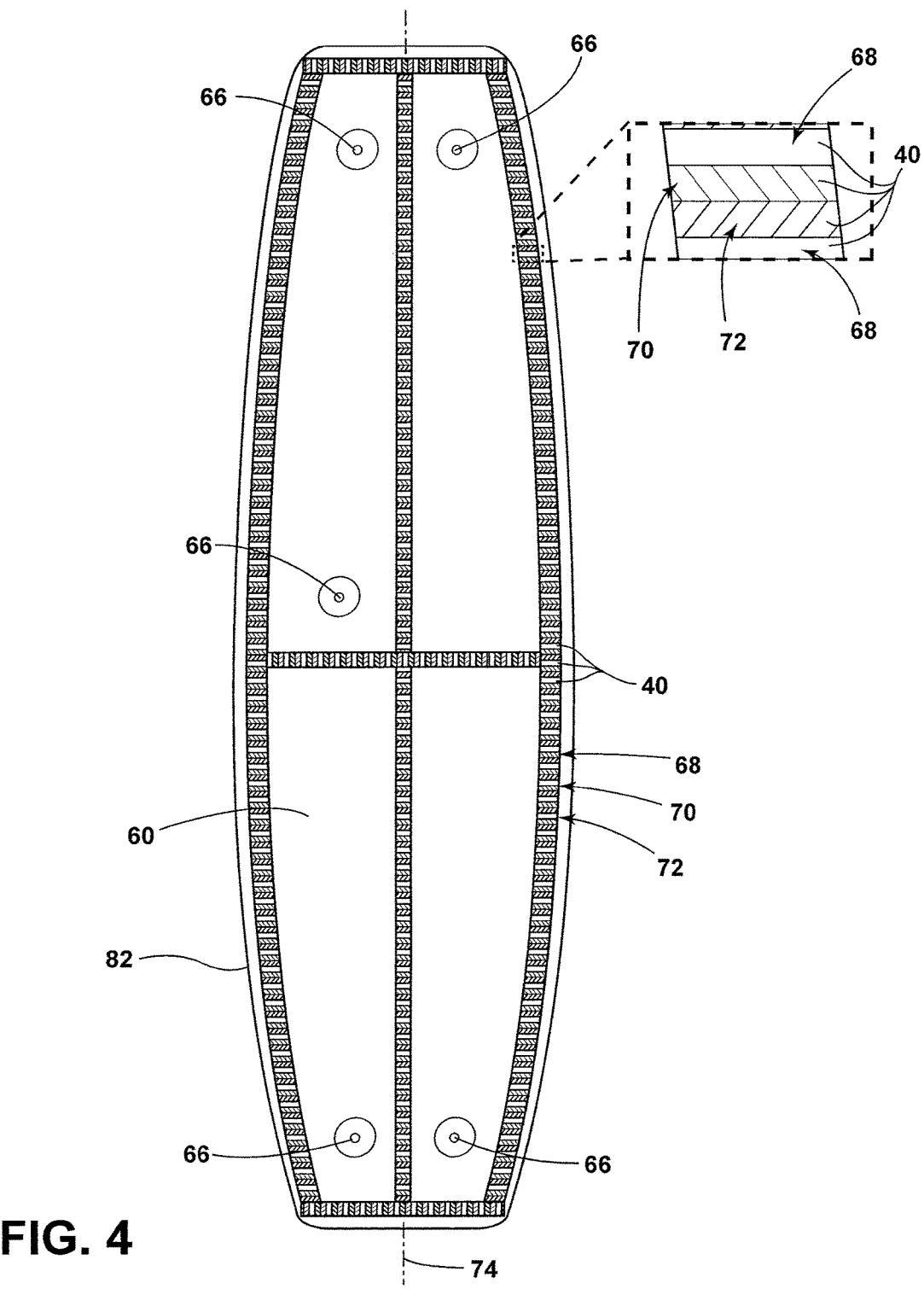
FIG. 4 is a front perspective view of a printed circuit board disposed within the badge having a first, a second, and a third set of light sources thereon, according to one embodiment.

Referring to FIG. 4, the badge 28 may contain one or more sets of light sources 68, 70, 72 that may be configured to illuminate in predefined patterns concurrently with one another. For example, as illustrated in FIG. 4, the badge 28 contains a first set of light sources 68 that may emit excitation light 24. A second set of light sources 70 may be substantially aligned with the first set of light sources 40. Similarly, a third set of light sources 72 may also be aligned with the first and/or second sets of light sources 68, 70. By placing the light sources in predefined sets 68, 70, 72, the badge 28 hardware costs software, and/or design time may be reduced. It will be appreciated that the badge 28 may include any number (one or more) sets of light sources 68, 70, 72 without departing from the teachings provided herein.

With further reference to FIG. 4, the light sources, according to one embodiment, that form the first, second and third sets of light sources 68, 70, 72 sources may be configured as Red, Green, and Blue (RGB) LEDs having separate red, green, and blue LED chips therein. Alternatively, the first, second and third sets of light sources 68, 70, 72 may include some, or all, unicolored light sources 40. Further, each individual set of light sources 68, 70, 72 may emit excitation light 24 at a different wavelength than any other set of light sources 68, 70, 72, or any of the sets of light sources 68, 70, 72 may emit a common wavelength of excitation light 24.

As illustrated in FIG. 4, a majority (i.e., more than half) of the light sources 40 may be substantially aligned along a common axis, line, plane, and/or border (e.g., line 74). For example, the light sources 40 may align with a periphery 82 of the PCB 60, the indicia 52 of the front viewable portion 36, and/or any other desired design and/or pattern of the badge 28.

According to one embodiment, a pulse of excitation light 24 of may be illuminated by the first set of light sources 68 and may last a short period of time approximately $\frac{1}{50}$ to $\frac{1}{100}$ of a second. Next, a pulse of excitation light 24 of by the second set of light sources 70 may last a short period of time approximately $\frac{1}{50}$ to $\frac{1}{100}$ of a second. Next, a pulse of excitation light 24 of by the third set of light sources 72 may last a short period of time approximately $\frac{1}{50}$ to $\frac{1}{100}$ of a second. This process may continue through a plurality of colors by each light source 40. Each light source 40 may be pulsed randomly or in any pre-defined pattern in any color.

Additionally, a variable electrical current may be supplied to each light source 40 to adjust the degree of illumination for each pulse of colored and/or white light. For example, the current may vary from 1 to 5 times the steady state current. Through the use of one or more sets of light sources 68, 70, 72, each pulsating at offset intervals, it is possible for the badge 28 to have a marquee effect, meaning the badge 28 may appear to have a moving, or scrolling, illumination pattern.

In an alternative embodiment, the first set of light sources 68 may flash a first color. The second set of light sources 70 may flash or illuminate in a second color at an offset interval from the first set of light sources. The third set of light sources 72 may then flash or illuminate in a third color at an offset interval from the first and second set of light sources 68, 70. Alternatively, the first, second, and/or third set of light sources 68, 70, 72 may emit light simultaneously and/or may remain at a constant color and brightness, or may flicker.

Figure 5:
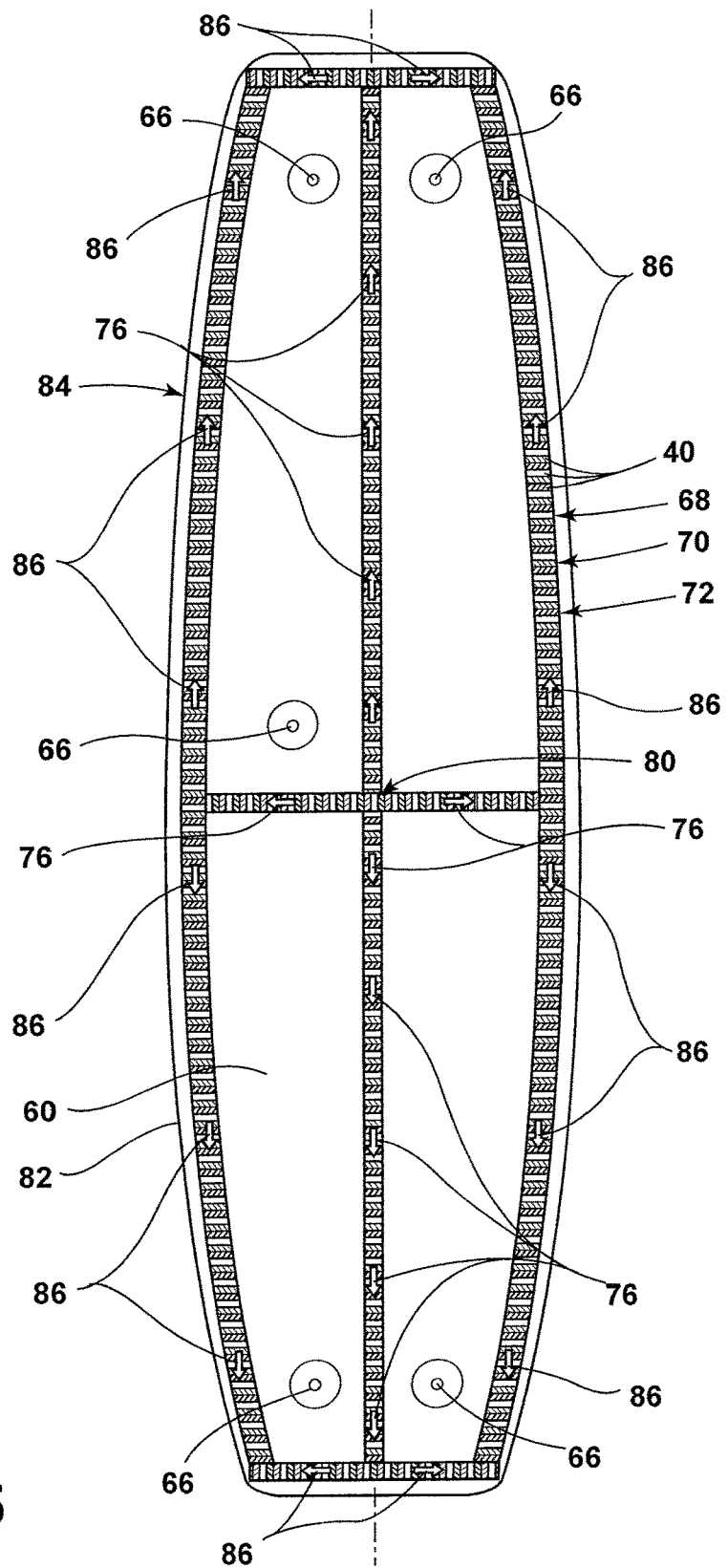
FIG. 5 is a front perspective view of a printed circuit board (PCB) disposed within the badge having a first, a second, and a third set of light sources thereon that are configured to sequentially illuminate in a predefined illumination pattern, according to one embodiment.

Referring to FIG. 5, arrows 76 illustrate one exemplary illumination pattern for illuminating badge 28. As illustrated, the first, second and third sets of light sources 68, 70, 72 may first illuminate proximately to a central location 80 of the PCB 60. The light sources 40 outwardly from the light sources 40 closest to the central location 80 may then sequentially illuminate towards the periphery 82 of the badge 28. Once the light sources 40 reach a location proximate to the periphery 82 of the badge 28, a border portion 84 of the badge 28 may sequentially illuminate, or some of the border portion 84 may illuminate independently in the directions shown by arrows 86. It will be understood, however, that the badge 28 may have any number of sets of light sources 68, 70, 72 that may illuminate in any pattern without departing from the teachings provided herein.

Figure 6A:
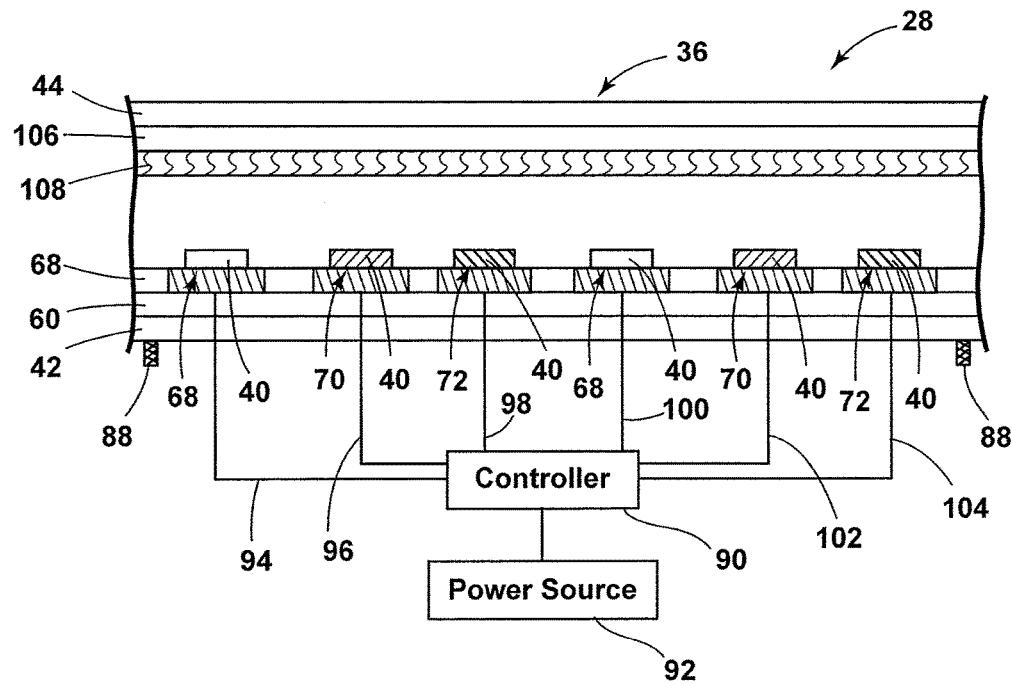
FIG. 6A is a cross-sectional view taken along the line VI-VI of FIG. 2 illustrating the badge, according to an alternate embodiment, having the first, the second, and the third set of light sources disposed within the badge.
Figure 6B:
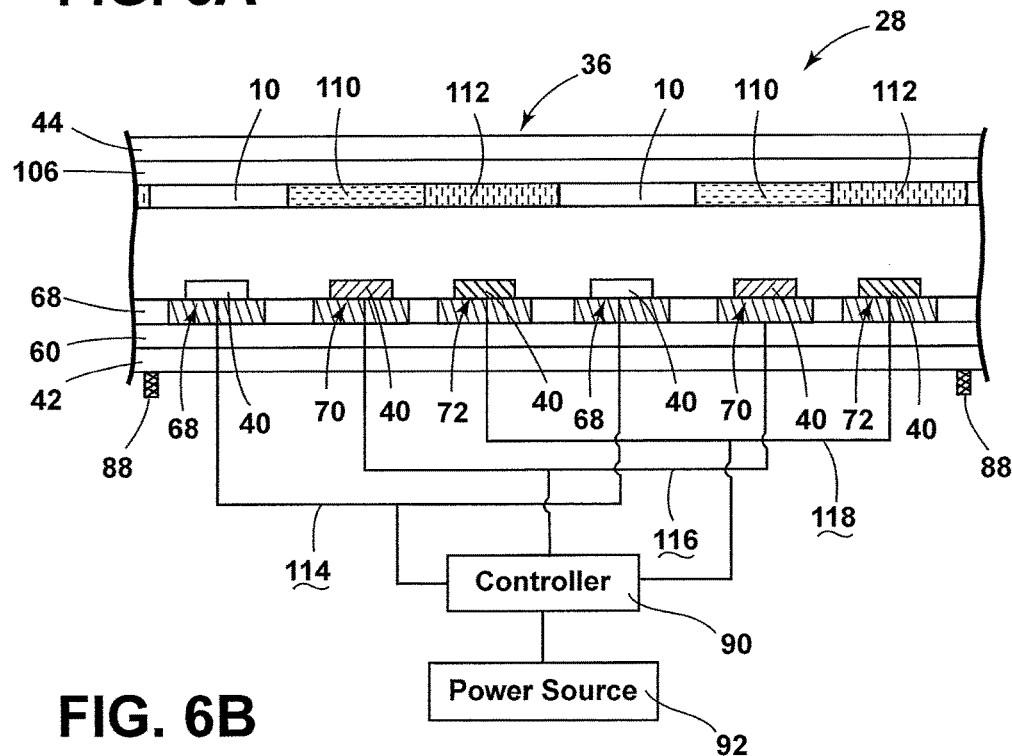
FIG. 6B is a cross-sectional view taken along the line VI-VI of FIG. 2 illustrating the badge, according to an alternate embodiment, having the first, the second, and the third set of light sources disposed within the badge, wherein each light source within each set is electrically coupled in parallel with the remaining light sources within the set of light sources.

Referring to FIGS. 6A and 6B, the badge 28 includes the housing 44 having the front viewable portion 36, as described above, and the substrate 42 that is capable of being secured to a vehicle 32 through attachment points 88. Any practicable means may be used for attaching the badge 28 to the vehicle 32 including any known process for mounting the badge 28 onto a vehicle 32, or integrally forming portions of the badge 28 (e.g., the substrate 42) with additional vehicle components, such as portions of the grille assembly 38. The front viewable portion 36 may illuminate in one or more predefined patterns.

Referring to FIG. 6A, the first, second and third sets of light sources 68, 70, 72 are each independently and electrically connected to a controller 90 and a power source 92 via electrical leads 94, 96, 98, 100, 102, 104. However, in alternate embodiments, each set of light sources 68, 70, 72 may be connected in series or in parallel configurations without departing from the teachings provided herein. As described above, the illumination of each set of light sources 68, 70, 72 may be offset from any other sets of light sources 68, 70, 72 within the badge 28 to create any predefined lighting pattern. The lighting patterns may be predefined when the badge is assembled, or may be later flashed to the controller 90 within the vehicle 32 and/or the badge 28 to add additional lighting patterns to the badge 28 at any time.

The badge 28 may include a decorative layer 106 that is disposed between the light sources and the front viewable portion 36. However, the decorative layer 106 may be disposed in any other location within the badge 28 in alternate embodiments. The decorative layer 106 may include a polymeric material or any other suitable material and is configured to control or modify an appearance of the front viewable portion 36. For example, the decorative layer 106 may be configured to confer a metallic appearance to the front viewable portion 36. The metallic appearance can be disposed rearwardly of or on any surface of the housing 44 through any method known in the art, including, but not limited to, sputter deposition, vacuum deposition (vacuum evaporation coating), electroplating, or directly printing onto the housing 44. The metallic appearance may be chosen from a wide range of reflective materials and/or colors, including, but not limited to, silver, chrome, copper, bronze, gold, or any other metallic surface. Additionally, an imitator of any metallic material may also be utilized without departing from the teachings provided herein. The decorative layer 106 or some portion thereof may be transparent and/or translucent to allow light to pass therethrough from an inner surface to an outer surface.

In other embodiments, the decorative layer 106 may be tinted any color to complement the vehicle structure on which the badge 28 is to be received. In any event, the decorative layer 106 may be at least partially light transmissible such that the converted light 26 is not prevented from illuminating the front viewable portion 36. The decorative layer 106 may also include opaque portions that may correspond with the opaque background region 50 of the badge 28.

With further reference to FIG. 6A, a light diffuser 108 may be disposed between the front viewable portion 36 and the light sources 40. For example, the light diffuser 108 may be a layer applied to the underside of the front viewable portion 36. The diffuser 108 can be transparent or translucent and generally functions to diffuse the light from the light sources so that unwanted hot spots and shadows are minimized. According to one embodiment, the inner surface and/or outer surface of the front viewable portion 36 may be coated, roughened or receive micro-faceting to aid in the light diffusion performance. Additionally, or alternatively, the diffuser 108 may be applied to a portion of the decorative layer 106 in order to optimize the light diffusing effect. In alternate embodiments, the diffuser 108 may be applied to or disposed on some or all of the light sources 40 disposed within the badge 28.

Referring to FIG. 6B, one or more of photoluminescent structures 10, 110, 112 may be coupled to the underside of the housing 44 and configured to luminesce in response to excitation light 24 emitted from one or more light sources 40 disposed inside the badge 28. In some embodiments, the photoluminescent structures 10 may be configured as the light diffuser 108, such that both components may be combined into a single structure. Alternatively still, the photoluminescent structure 10 may be disposed within the light diffuser 108.

As illustrated in FIG. 6B, each set of light sources 68, 70, 72 is connected in parallel to the controller 90 through conductive leads 114, 116, 118 such that each light source 40 within each set 68, 70, 72 illuminates concurrently when power is supplied thereto by the controller 90.

According to one embodiment, some, or all, of the excitation light 24 emitted from the light sources 40 is converted by the photoluminescent structures 10, 110, 112 into converted light 26 of a different wavelength and outputted therefrom. The converted light 26 may correspond to a visible light, which includes the portion of the electromagnetic spectrum that can be detected by the human eye (~390-700 nanometers in wavelength) and may be expressed in a variety of colors defined by a single wavelength (e.g., red, green, blue) or a mixture of multiple wavelengths (e.g., white). Thus, it should be understood that the photoluminescent structures 10, 110, 112 may be configured such that converted light 26 outputted therefrom is capable of being expressed as unicolored or multicolored light. According to one embodiment, each set of light sources 68, 70, 72 is configured to emit blue excitation light 24 and the photoluminescent structures 10 are configured to convert the blue excitation light 24 into a variety of colored, converted light 26 having a color temperature of approximately 4000K to 5000K. The converted light 26 escapes from the badge 28 via the front viewable portion 36, thereby causing the front viewable portion 36 to glow. However, in alternate embodiments, each set of light sources 68, 70, 72 emits excitation light 24 in the visible spectrum.

In addition to illuminating, the front viewable portion 36 may be configured to flash, or sparkle, at one or more locations in one or more colors. The locations may be chosen to correspond to a location proximately located to a corner, edge, or periphery 82 of the PCB 60. Alternatively, the locations may correspond to intersection points of the light sources 40, when the light sources 40 are arranged in a predefined pattern. The sparkle effect at each location may be produced by light emitted from a corresponding light source 40 that is disposed inside the badge 28. Each light source 40 may be operated to pulse light onto the corresponding sparkle location. According to one embodiment, a pulse of excitation light 24 from a given light source 40 may last approximately $\frac{1}{10}$ to $\frac{1}{100}$ of a second and any of the light sources 40 may be pulsed randomly or in a pattern in a multitude of colors.

According to one embodiment, the first set of light sources 68 may be configured to emit a wavelength of excitation light 24 that excites the first photoluminescent structure 10. The second set of light sources 70 may be configured to excite the second photoluminescent structure 110. Similarly, the third set of light sources 72 may be configured to excite the third photoluminescent structure 112. Alternatively, the first photoluminescent structure 10 may be disposed above specific sets of light sources 68, 70, 72 while other portions of the housing 44 may not have a photoluminescent structure 10 thereabove.

Figure 7:
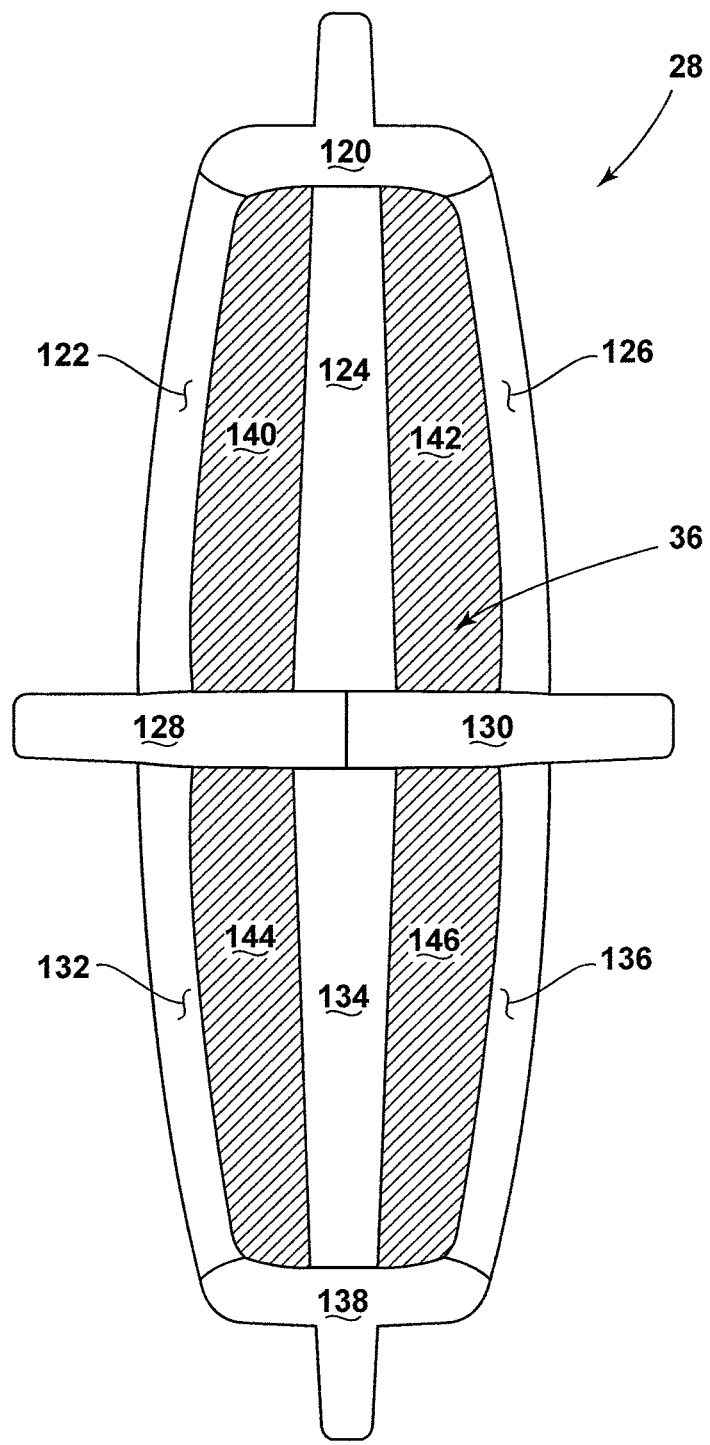
FIG. 7 is a front view of the badge, according to one embodiment, having a front viewable portion that includes a plurality of independently illuminable portions.

Referring to FIG. 7, the badge 28 may include a plurality of independently illuminable portions 120, 122, 124, 126, 128, 130, 132, 134, 136, 138, 140, 142, 144, 146. Each portion 120, 122, 124, 126, 128, 130, 132, 134, 136, 138, 140, 142, 144, 146 may include any number of sets of light sources 68, 70, 72 therein for illuminating in any lighting pattern.

As illustrated in FIG. 7, the badge 28 includes 14 independently illuminable portions 120, 122, 124, 126, 128, 130, 132, 134, 136, 138, 140, 142, 144, 146. However, in alternate embodiments, the badge 28 many include any number of portions without departing from the teachings provided herein.

Each illuminable portion 120, 122, 124, 126, 128, 130, 132, 134, 136, 138, 140, 142, 144, 146 of the badge 28 may be configured to illuminate in a specific pattern based on predefined conditions. For example, light sources 40 within portion 130 may sequentially illuminate when the vehicle's 32 left turn signal is initiated when the front viewable portion 36 of the badge 28 is directed outwardly from the front portion 30 of the vehicle 32. Conversely, portion 128 may sequentially illuminate when the vehicles' 32 right turn signal is initiated when the front viewable portion 36 of the badge 28 is directed outwardly from the front portion 30 of the vehicle 32.

Alternatively, if the badge 28 is attached to a side portion 34 of the vehicle 32, any portion 120, 122, 124, 126, 128, 130, 132, 134, 136, 138, 140, 142, 144, 146 may flash when the vehicle's 32 turn signal for the side of the car that the badge 28 is affixed thereto is initiated. According to one embodiment, the badge 28 may be illuminated in the marquee pattern when the turn signal is initiated. The badge 28 may perform any other lighting effect, such as, but not limited to, illuminating from the top down or bottom up within one portion, sequentially from one portion to an adjacent portion, from the left to right or vice versa, as described above, and/or from a side to a center, etc.

Figure 8:
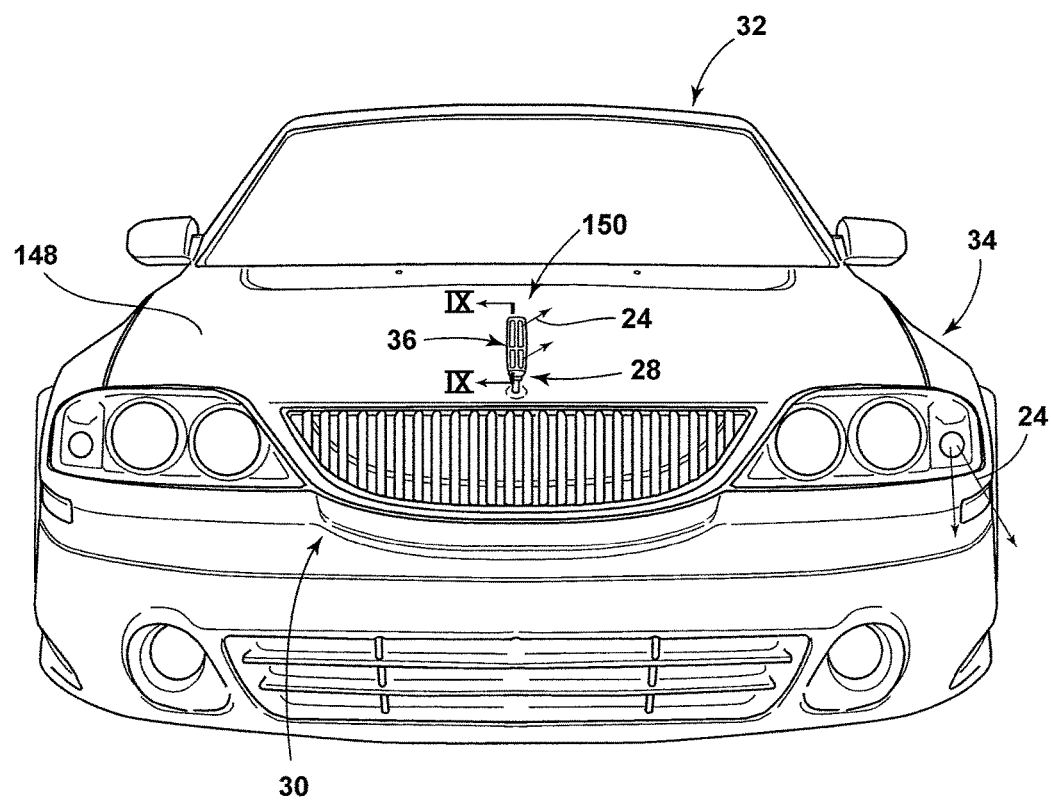
FIG. 8 is a front perspective view of the badge extending upwardly from a body panel of the vehicle, according to one embodiment.

Referring to FIG. 8, according to one embodiment, the badge 28 may be configured as a hood ornament. Accordingly, the badge 28 may be arranged to mount on a hood 148, or any other body panel, of the vehicle 32 and extend upwardly therefrom.

With further reference to FIG. 8, the badge 28 may include a front viewable portion 36, as described above, and a rear viewable portion 150 that faces the occupants of the vehicle 32. Accordingly, the substrate 42, like the housing 44, may be light transmissive such that excitation light 24 and/or converted light 26 may exit through the substrate 42 and/or the housing 44. The front viewable portion 36 and/or the rear viewable portion 150 may be illuminated for any reason based on a plurality of predefined vehicular conditions. For example, when the vehicle's 32 left turn signal is initiated, a corresponding portion of the badge 28 may concurrently illuminate the front viewable portion 36 and/or the rear viewable portion 150. The rear viewable portion 150 may also illuminate in correlation with any other vehicular condition, including, but not limited to, as a blind spot warning indicator for either the front when used with a front mounted/side looking camera or a rear blind spot detector. Additionally, or alternatively, the rear viewable portion 150 may illuminate in any color (e.g., red) to act as an auxiliary collision indicator to alert the driver of the vehicle 32 of an approaching unsafe condition. The badge 28 may also be used as an indicator and/or an assembly plant status indicator for the electrical system of the vehicle 32.

Figure 9:
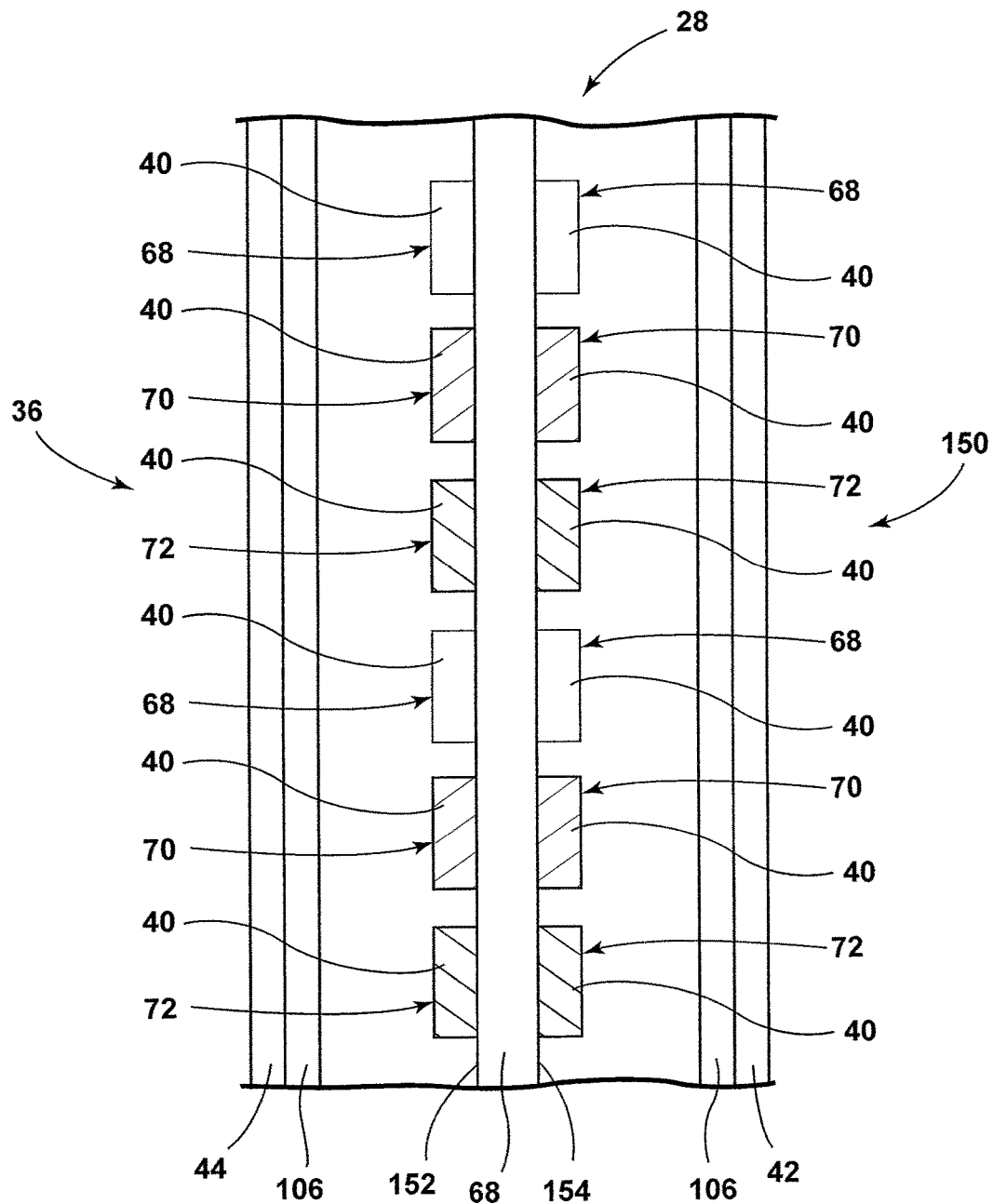
FIG. 9 is a cross-sectional view taken along the line IX-IX of FIG. 8 illustrating the badge having the first, the second, and the third set of light sources disposed on two opposing surfaces of the PCB.

Referring to FIG. 9, an exemplary cross section taken along the line IV-IV of FIG. 8 is illustrated. The badge 28, as described herein, may have one or more sets of light sources 68, 70, 72. The light sources 40 may be disposed on two opposing sides 152, 154 of the PCB 60 and configured to direct light in two substantially opposing directions. The light sources 40 may be independently illuminable, or may be illuminated by set 68, 70, 72 to create a marquee lighting pattern, or any other desired pattern. A decorative layer 106 may be disposed between the light sources 40 and the front viewable portion 36. The decorative layer 106 may additionally, or alternatively, be disposed between the light sources 40 and the rear viewable portion 150 to substantially conceal the components disposed between the substrate 42 and housing 44.

Figure 10:
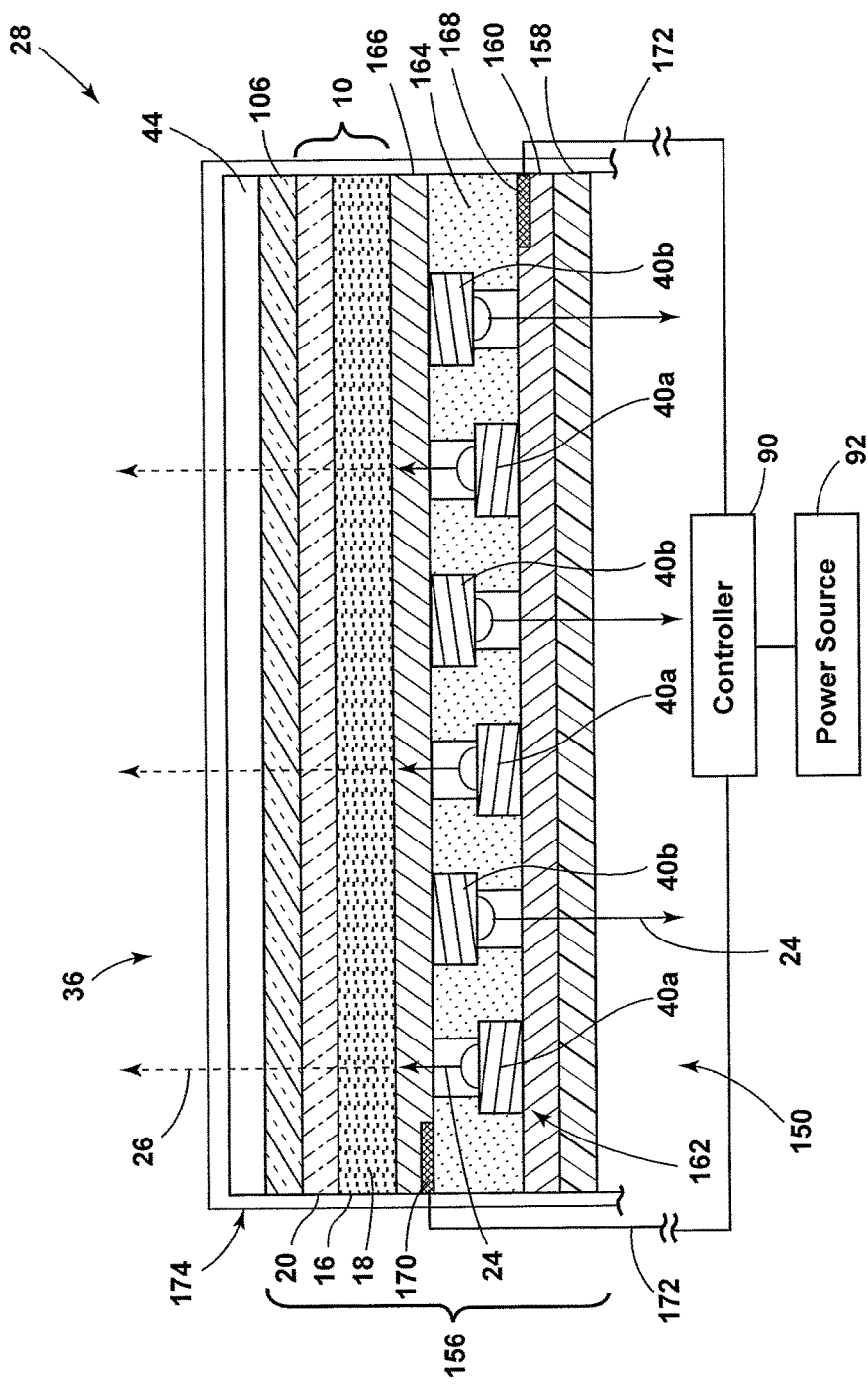
FIG. 10 is a cross-sectional view taken along line IX-IX of FIG. 8 illustrating the light source configured as a light-producing assembly, according to an alternate embodiment.

Referring to FIG. 10, a cross section taken along the line IV-IV of FIG. 8 illustrates a portion of the badge 28 according to an alternate embodiment in which the badge 28 includes first and second plurality of LED sources 40a, 40b integrally formed into a light-producing assembly 156. While the light-producing assembly 156 is shown in a planar configuration, it should be appreciated that non-planar configurations are possible in instances where it is desired to place the light-producing assembly 156 in a curved orientation.

With respect to the illustrated embodiment, the light-producing assembly 156 includes a substrate 158, which may include a substantially transparent, or translucent, polycarbonate, poly-methyl methacrylate (PMMA), or polyethylene terephthalate (PET) material in the range of 0.005 to 0.060 inches thick. A positive electrode 160 is arranged over the substrate 158 and includes a substantially transparent conductive material such as, but not limited to, indium tin oxide. The positive electrode 160 is electrically connected to a printed light emitting diode (LED) arrangement 162 that is arranged within a semiconductor ink 164 and applied over the positive electrode 160. Likewise, a substantially transparent negative electrode 166 is also electrically connected to the printed LED arrangement 162. The negative electrode 166 is arranged over the semiconductor ink 164 and includes a transparent or translucent conductive material such as, but not limited to, indium tin oxide. In alternative embodiments, the positive and negative electrodes 160, 166 may swap positions within the light-producing assembly 156 if desired. Each of the positive and negative electrodes 160, 166 are electrically connected to a controller 90 via a corresponding bus bar 168, 170 connected to one of the conductive leads 172. The bus bars 168, 170 may be printed along opposite edges of the positive and negative electrodes 160, 166 and the points of connection between the bus bars 168, 170 and the conductive leads 172 may be at opposite corners of each bus bar 168, 170 to promote uniform current distribution along the bus bars 168, 170. The controller 90 may also be electrically connected to a power source 92, which may correspond to a vehicular power source operating at 12 to 16 VDC.

The printed LED arrangement 162 may be dispersed in a random or controlled fashion within the semiconductor ink 164. In the presently illustrated embodiment, the printed LED arrangement 162 includes a first plurality of LED sources 40a biased to direct light towards the front viewable portion 36 and a second plurality of LED sources 40b biased to direct light towards the rear viewable portion 150. The LED sources 40a, 40b may correspond to micro-LEDs of gallium nitride elements in the range of 5 to 400 microns in size and the semiconductor ink 164 may include various binders and dielectric material including, but not limited to, one or more of gallium, indium, silicon carbide, phosphorous, and/or translucent polymeric binders.

Given the small sizing of the printed LED sources 40a, 40b, a relatively high density may be used to create substantially uniform illumination. The semiconductor ink 164 can be applied through various printing processes, including ink jet and silkscreen processes to selected portion(s) of the positive electrode 160. More specifically, it is envisioned that the LED sources 40a, 40b are dispersed within the semiconductor ink 164, and shaped and sized such that they align with the positive and negative electrodes 160, 166 during deposition of the semiconductor ink 164. The portion of the LED sources 40a, 40b that ultimately are electrically connected to the positive and negative electrodes 160, 166 may be selectively activated and deactivated by the controller 90. The LED sources (e.g., 40a) may be disposed in one or more sets, as described herein. Additional information regarding the construction of light-producing assemblies is disclosed in U.S. Patent Publication No. 2014/0264396 A1 to Lowenthal et al., entitled "ULTRA-THIN PRINTED LED LAYER REMOVED FROM SUBSTRATE," the entire disclosure of which is incorporated herein by reference.

Referring still to FIG. 10, the light-producing assembly 156 may further include the photoluminescent structure 10 arranged over the negative electrode 166 as a coating, layer, film or other suitable deposition. As described above, the photoluminescent structure 10 may be arranged as a multi-layered structure including an energy conversion layer 16, an optional stability layer 20, and/or an optional protective layer 22.

In some embodiments, the decorative layer 106 may be disposed between the front viewable portion 36 and the light-producing assembly 156. The decorative layer 106 may include a polymeric material, film, and/or other suitable material that is configured to control or modify an appearance of the front viewable portion 36. For example, the decorative layer 106 may be configured to confer a metallic appearance when the light-producing assembly 156 is in an unilluminated state. In other embodiments, the decorative layer 106 may be tinted any color.

An overmold material 174, which may correspond to the housing 44, is disposed around the light-producing assembly 156 and/or the first photoluminescent structure 10. The overmold material 174 may protect the light-producing assembly 156 from physical and chemical damage arising from environmental exposure. For example, the overmold material 174 may protect the light-producing assembly 156 from contact with environmental debris.

According to one embodiment, the light sources 40 on a first side 152 of the PCB 60 may be printed thereon while the light sources 40 on the opposing side 154 of the PCB 60 may be conventional, non-printed LEDs. Moreover, a second photoluminescent structure 110 may be disposed between the LED sources and the substrate 42. Additional information on the arrangements of distinct photoluminescent materials and corresponding LEDs is disclosed in U.S. patent application Ser. No. 14/697,035 to Salter et al., entitled "LIGHT-PRODUCING ASSEMBLY FOR A VEHICLE," the entire disclosure of which is incorporated herein by reference.

Figure 11:
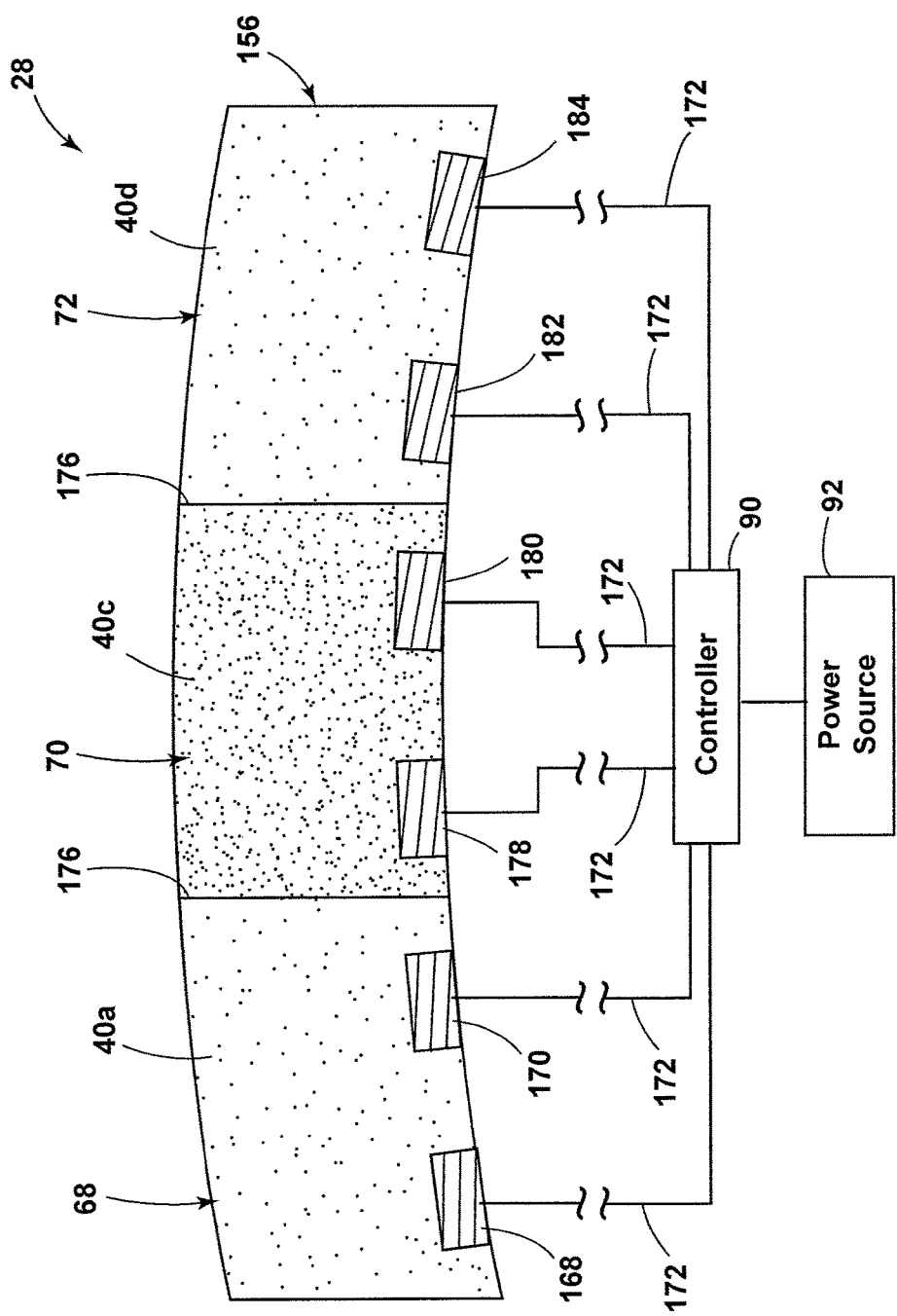
FIG. 11 is a top view of the light-producing assembly, according to one embodiment, having varying types and concentrations of LED sources transversely along the light-producing assembly.

Referring to FIG. 11, the light-producing assembly 156, according to one embodiment, is illustrated from a top view having varying types and concentrations of LED sources 40a, 40c, 40d transversely along the light-producing assembly 156 to corresponding with the first, second and third sets of light sources 68, 70, 72. As illustrated, the first, second, and third sets of light sources 68, 70, 72 may be separated by insulative, or non-conductive, barriers 176 from proximately disposed sets of light sources 68, 70, 72 through any means known in the art such that each set of light sources 68, 70, 72 may be illuminated independently of any other set of light sources 68, 70, 72. Further, each set of light sources 68, 70, 72 disposed within the light-producing assembly 156 may include a respective bus bar 168, 170, 178, 180, 182, 184 coupled to the controller 90 and configured to electronically energize and then illuminate each respective set of light sources 68, 70, 72.

The LED sources 40a, 40c, 40d within each set of light sources 68, 70, 72 may all be orientated in the same direction and/or in opposing directions, as described herein. It should be appreciated that the light-producing assembly 156 may include any number of sets of light sources 68, 70, 72 having varying LED sources 40a, 40c, 40d therein that may illuminate in any desired color. Moreover, it should be appreciated that the portions having varied LED sources 40a, 40c, 40d may be orientated in any practicable manner and need not be disposed adjacently.

With further reference to FIG. 11, the semiconductor ink 164 may also contain various concentrations of LED sources 40a, 40c, 40d such that the density of the LED sources 40a, 40c, 40d, or number of LED sources 40a, 40c, 40d per unit area, may be adjusted for various lighting applications. In some embodiments, the density of LED sources 40a, 40c, 40d may vary across the length of the light-producing assembly 156. For example, the first set of light sources 68 may have a greater density of LED sources 40a than alternate sets of light sources 70, 72, or vice versa.

Figure 12:
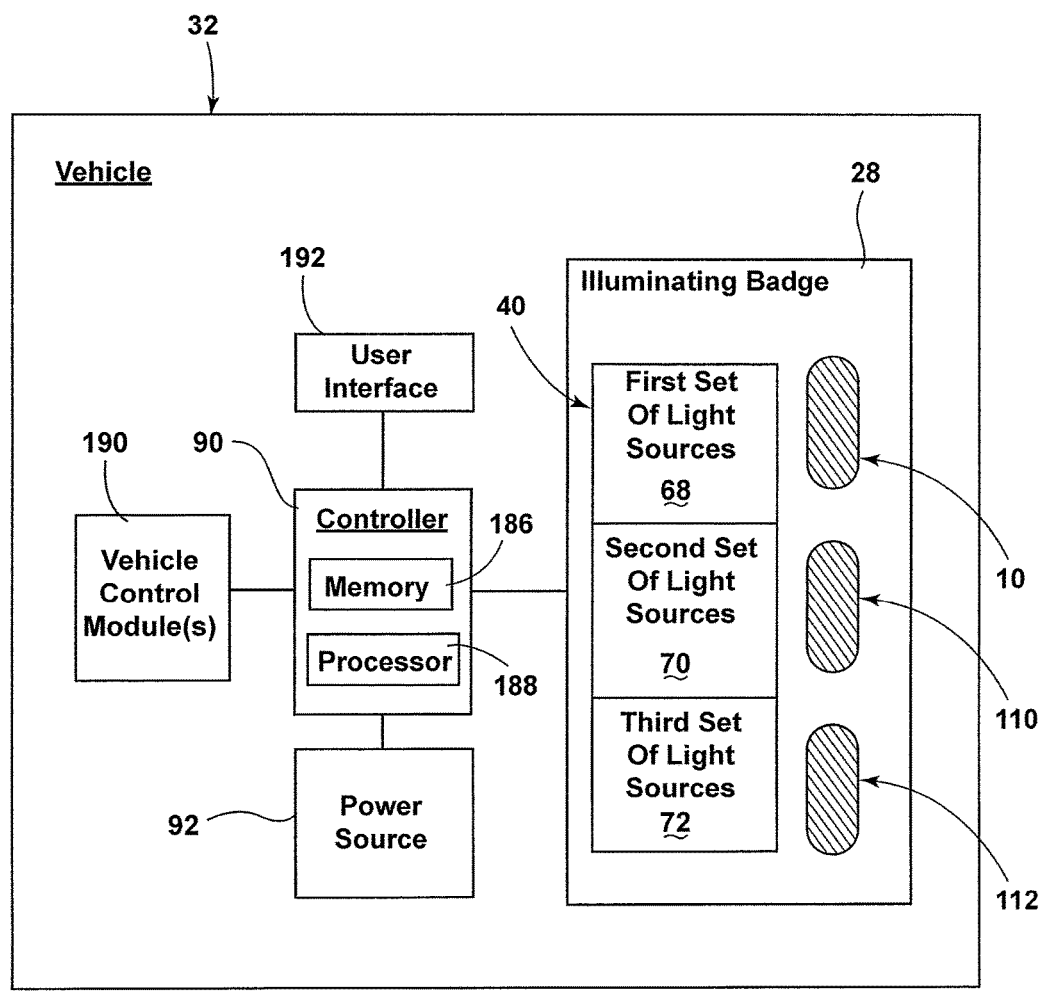
FIG. 12 is a block diagram of the vehicle, the badge, and the lighting control.

Referring to FIG. 12, a box diagram of a vehicle 32 is shown in which an illuminated badge 28 is implemented. The badge 28 includes a controller 90 in communication with the first, second, and third sets of light sources 68, 70, 72. The controller 90 may include memory 186 having instructions contained therein that are executed by a processor 188 of the controller 90. The controller 90 may provide electrical power to the light sources 40 via a power source 92 located onboard the vehicle 32. In addition, the controller 90 may be configured to control the light output of each set of light sources 68, 70, 72 based on feedback received from one or more vehicle control modules 190 such as, but not limited to, a body control module, engine control module, steering control module, brake control module, the like, or a combination thereof. By controlling the light output of the first, second, and third sets of light sources 68, 70, 72, the badge 28 may illuminate in a variety of colors and/or patterns to provide an aesthetic appearance, such as a marquee or any other dynamic illumination pattern, or may provide vehicle information to an intended observer. For example, the illumination provided by the front viewable portion 36 may be used for numerous vehicle applications, such as, but not limited to, a car finding feature, a remote start indicator, a door lock indicator, a door ajar indicator, a running light, etc. The illumination provided by the rear viewable portion 150 may be used for numerous vehicle applications, such as, but not limited to, a turn indicator, a blind spot warning light, a dangerous condition approaching, etc.

In operation, the badge 28 may exhibit a constant unicolor or multicolor illumination. For example, the controller 90 may prompt one of the first, second, and third sets of light sources 68, 70, 72 within the badge 28 to flash a multitude of colors at a pre-defined interval. Simultaneously, the remaining sets of light sources 68, 70, 72 may illuminate in a steady unicolor, may flash through a multitude of colors, may excite the first, second, and/or third photoluminescent structures 10, 110, 112, and/or be placed in an off state by the controller 90. In one embodiment, the controller 90 may illuminate each set of light sources 68, 70, 72 in any color at offset time intervals such that one set of light sources (e.g., the second set of light sources 70) illuminates as another set of light sources returns to an unilluminated state (e.g., the first set of light sources 68). For example, each first, second, and third set of light source 68, 70, 72 may illuminate for ¹⁄₁₀₀ of a second to 1 second. Also, the controller 90 may vary power to each light source 40 from 1 to 5 times steady state current to vary the color and brightness of each illumination. The controller 90 may also illuminate multiple colors within a single light source 40 concurrently, thereby producing additional color configurations if the single light source 40 is configured as a RGB LED.

In another embodiment, the photoluminescent structures 10, 110, 112 may exhibit periodic unicolor or multicolor illumination. For example, the controller 90 may prompt the first set of light sources 68 to periodically emit excitation light 24 to cause the first photoluminescent structure 10 to periodically illuminate in the first color. Alternatively, the controller 90 may prompt the second set of light sources 70 to periodically emit excitation light 24 to cause the second photoluminescent structure 110 to periodically illuminate. Similarly, the controller 90 may prompt the third set of light sources 72 to periodically emit excitation light 24 to cause the third photoluminescent structure 112 to periodically illuminate. Alternatively, the controller 90 may control the first, second, and third set of light sources 68, 70, 72 to simultaneously and periodically emit the excitation light 24 to cause the first, second, and third photolumine scent structures 10, 110, 112 to periodically illuminate simultaneously.

The controller 90 may control the first, second, and third sets of light sources 68, 70, 72 to periodically emit the excitation light 24 at a regular time interval and/or an irregular time interval. Thus, the badge 28 may appear in any color based on a combination of photoluminescent structures 10, 110, 112 while simultaneously having set points flicker in multiple different colors to create a unique appearance within the badge 28.

In another embodiment, the badge 28 may include a user interface 192. The user interface 192 may be configured such that a user may control the wavelength of excitation light 24 24 that is emitted by the light source 40 or the pattern of illumination of displayed on the front viewable portion 36 and/or the rear viewable portion 150.

With respect to the above examples, the controller 90 may modify the intensity of the emitted excitation light 24 by pulse-width modulation or current control. Also, the controller 90 may vary power to each light source 40 from 1 to 5 times steady state current to vary the color and brightness of each illumination. The controller 90 may also illuminate multiple colors within a single multicolored light source 40 concurrently, thereby producing additional color configurations.

In some embodiments, the controller 90 may be configured to adjust a color of the converted light 26 by sending control signals to adjust an intensity or energy output level of the light source 40. For example, if the first, second, and third sets of light sources 68, 70, 72 are configured to emit the excitation light 24 at a low level, substantially all of the excitation light 24 may be converted to the converted light 26 by the first, second, and/or third photoluminescent structures 10, 110, 112. In this configuration, a color of light corresponding to the converted light 26 may correspond to the color of the converted light 26 from the badge 28. If the first, second, and third sets of light sources 68, 70, 72 are configured to emit the excitation light 24 at a high level, only a portion of the excitation light 24 may be converted to the converted light 26 by the first, second, and/or third photoluminescent structures 10, 110, 112. In this configuration, a color of light corresponding to mixture of the excitation light 24 and the converted light 26 may be output as the converted light 26. In this way, the controller 90 may control an output color of the converted light 26.

Though a low level and a high level of intensity are discussed in reference to the excitation light 24, it shall be understood that the intensity of the excitation light 24 may be varied among a variety of intensity levels to adjust a hue of the color corresponding to the converted light 26 from the badge 28. The variance in intensity may be manually altered, or automatically varied by the controller 90 based on predefined conditions. According to one embodiment, a first intensity may be output from the badge 28 when a light sensor senses daylight conditions. A second intensity may be output from the badge 28 when the light sensor determines the vehicle 32 is operating in a low light environment.

As described herein, the color of the converted light 26 may be significantly dependent on the particular photoluminescent materials 18 utilized in the first, second, and third photoluminescent structures 10, 110, 112. Additionally, a conversion capacity of the first, second, and third photoluminescent structures 10, 110, 112 may be significantly dependent on a concentration of the photoluminescent material 18 utilized in the first, second, and third photoluminescent structures 10, 110, 112. By adjusting the range of intensities that may be output from the first, second, and/or third set of light sources 68, 70, 72, the concentration, types, and proportions of the photoluminescent materials 18 in the photoluminescent structures 10, 110, 112 discussed herein may be operable to generate a range of color hues of the converted light 26 by blending the excitation light 24 with the converted light 26. Moreover, the first, second, and third photoluminescent structures 10, 110, 112 may include a wide range of photoluminescent materials 18 that are configured to emit the converted light 26 for varying lengths of time.

Accordingly, an illuminating badge for a vehicle has been advantageously described herein. The badge provides various benefits including an efficient and cost-effective means to produce illumination that may function as a distinct styling element that increases the refinement of a vehicle, or any other product that may have an illumination assembly disposed thereon.

It is also important to note that the construction and arrangement of the elements of the disclosure as shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown in multiple parts may be integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of the wide variety of materials that provide sufficient strength or durability, in any of the wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A badge for a vehicle, comprising:
   a housing having a viewable portion;
   a first light source disposed rearwardly of the viewable portion;
   a second light source disposed adjacently to the first light source;
   a third light source disposed adjacently to the first light source, wherein the first, the second, and the third light sources are configured to illuminate at offset intervals and emit respective first, second, and third wavelengths that are different from one another; and
   a first, a second, and a third photoluminescent structure each including at least one photoluminescent material therein configured to perform an energy conversion on the first, the second, or the third wavelengths of light into a visible converted light.

2. The badge of claim 1, wherein the first light source is disposed proximate at least one of an outer edge and a corner of the front viewable portion.

3. The badge of claim 1, wherein the badge further comprises a light diffuser proximate the front viewable portion.

4. The badge of claim 1, wherein the viewable portion includes a plurality of independently illuminable portions, the first, the second, and the third light sources configured to independently illuminate at least one of the plurality of independently illuminable portions.

5. A vehicle badge, comprising:
   a housing having a front viewable portion;
   a substrate attached to the housing and having a rear viewable portion; and
   first, second, and third sets of light sources, each comprising at least one of an ultraviolet LED, a violet LED, and a blue LED and configured to direct light through the front viewable portion and the rear viewable portion and disposed between the rear viewable portion and the front viewable portion.

6. The vehicle badge of claim 5, further comprising:
   a first decorative layer disposed between the first set of light sources and the front viewable portion; and
   a second decorative layer disposed between the first set of light sources and the rear viewable portion.

7. The vehicle badge of claim 5, wherein the first, second and third sets of light sources each comprise one or more Red, Green, and Blue (RGB) LEDs.

8. The vehicle badge of claim 5, wherein each set of light sources independently illuminates while at least one other set of light sources is unilluminated to form a predefined lighting pattern.

9. A badge, comprising:
   a housing having a front viewable portion, the front viewable portion including a plurality of independently illuminable portions;
   a photoluminescent structure operably coupled with the housing; and
   a plurality of light sources disposed within each independently illuminable portion, the plurality of light sources distributed into sets within each illuminable portion and configured to independently excite the photoluminescent structure based on an activation of at least one of the plurality of light sources.

10. The badge of claim 7, wherein each set of light sources illuminates sequentially as the other sets of light sources become unilluminated to create a marquee lighting pattern.

11. The badge of claim 7, further comprising:
   a controller configured to control an output of each light source, wherein each light source illuminates in a different color.

12. The badge of claim 7, further comprising:
   a decorative layer disposed between the housing and the first, the second, and the third sets of light sources.

13. The badge of claim 7, wherein each set of light sources sequentially illuminates for a time period of about ⅒ to 1 second.

14. The badge of claim 7, further comprising:
   a light diffuser disposed between the housing and the first, the second, and the third sets of light sources.

15. The badge of claim 7, further comprising:
   a substrate having a rear viewable portion, wherein the rear viewable portion includes a plurality of independently illuminable portions.

16. The badge of claim 15, wherein each portion illuminates independently based on a predefined vehicular condition.

\* \* \* \* \*

UNITED STATES PATENT AND TRADEMARK OFFICE
CERTIFICATE OF CORRECTION

PATENT NO. : 10,118,568 B2  
APPLICATION NO. : 15/065240  
DATED : November 6, 2018  
INVENTOR(S) : Salter et al.

Page 1 of 1

It is certified that error appears in the above-identified patent and that said Letters Patent is hereby corrected as shown below:

In the Claims

Column 18:  
Claim 10, Line 58:  
"claim 7" should be --claim 9--.  
Claim 11, Line 61:  
"claim 7" should be --claim 9--.  
Claim 12, Line 65:  
"claim 7" should be --claim 9--.  
Column 19:  
Claim 13, Line 1:  
"claim 7" should be --claim 9--.  
Claim 14, Line 4:  
"claim 7" should be --claim 9--.  
Claim 15, Line 7:  
"claim 7" should be --claim 9--.

Signed and Sealed this  
Twenty-ninth Day of January, 2019

Andrei Iancu  
*Director of the United States Patent and Trademark Office*